Aug. 27, 1957 — J. H. SCOTT — 2,804,045
SEPARATING APPARATUS FOR HATCHING BRINE SHRIMP
Filed May 11, 1955
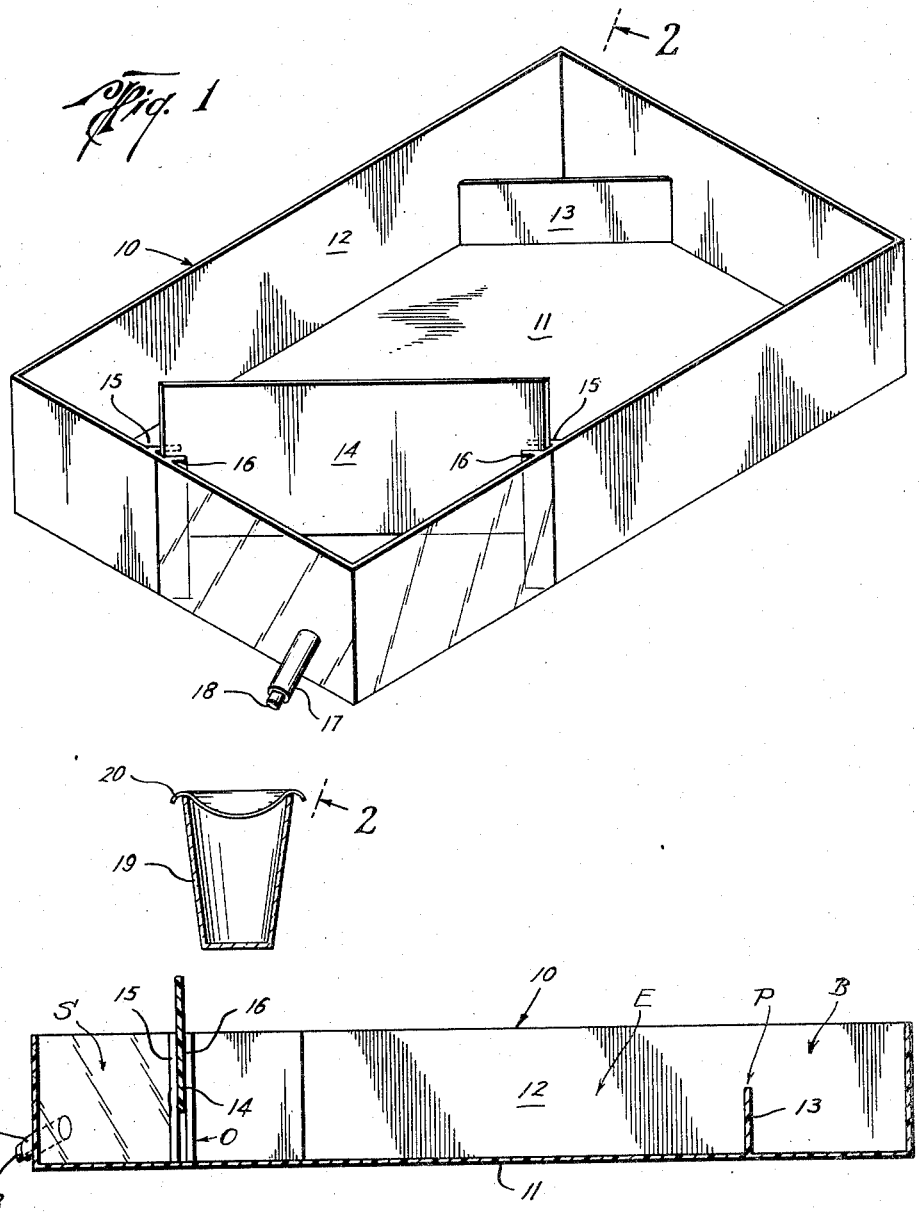
John H. Scott
INVENTOR.
BY Murray Robinson
ATTORNEY

United States Patent Office 2,804,045
Patented Aug. 27, 1957

2,804,045

SEPARATING APPARATUS FOR HATCHING BRINE SHRIMP

John H. Scott, Houston, Tex.

Application May 11, 1955, Serial No. 507,561

5 Claims. (Cl. 119—2)

This invention pertains to apparatus for hatching brine shrimp.

The principal object of the invention is to provide apparatus for hatching shrimp that will separate the shrimp from the unhatched eggs and the shells of the hatched eggs and allow the shrimp to be removed as required.

Other objects and advantages of the invention will appear from the following description of a preferred embodiment of the invention, reference being had to the accompanying drawings wherein:

Figure 1 is a perspective or isometric view of a hatching device according to the invention; and Figure 2 is a diagonal vertical section through the device shown in Figure 1, taken along line 2—2.

Referring to Figure 1, the hatching device there shown comprises a rectangular tray having a flat bottom 11 and vertical side walls 12. The tray is divided into three sections by diagonal partitions 13 and 14. The section of the tray in the corner divided off by partition 13 is the brine inlet section B. The partition 13 extends from the bottom 11 only part way up toward the upper edge of walls 12, leaving a passageway P over the top. The section of the tray in the corner divided off by the partition 14 is the shrimp outlet S. The partition 14 is equal in height to the depth of the tray and is slidably held between guides 15—16 at each end. There is sufficient friction between the guides and partition 14 so it will stay elevated as shown which is its normal position in which its lower edge is above the bottom of the tray leaving a passageway O thereunder. An outlet pipe 17 extends from the side of the tray at a level above the bottom of the tray and below the upper edge thereof and preferably a little below the half way level. Pipe 17 is provided with a cork 18 or other closure means that can be removed from outlet blocking position whenever desired. The section of the tray between the partitions 13 and 14 is the egg hatching section E.

The entire tray including the bottom 11 and sides 12 and partitions 13 and 14 are dark or opaque except for the portion of the bottom 11 and sides 12 in the shrimp outlet section S which are light (white) colored or coated with luminous paint or translucent or preferably, as shown, transparent. Suitably the whole device may be made of transparent plastic and the portions that are to be opaque can be painted with black lacquer. The outlet tube 15 is then also transparent, as is preferred. Obviously less than all of the shrimp outlet section walls and bottom can be transparent and less than the entire remainder of the tray can be opaque though the arrangement described is preferred.

To use the apparatus in hatching brine shrimp, prepare brine by dissolving salt in water in the ratio of about one tablespoon of rock salt to one quart of water. Pour the brine into the tray. Pour shrimp eggs into the egg hatching section in the ratio of ¼ to ½ teaspoon of eggs per quart of brine. Preferably tray 10 will hold a little over one quart. Place the box so the brine inlet and egg sections B and E, respectively, are shaded and the shrimp outlet S is in the light, preferably direct sunlight. The eggs float on the brine and hence do not move over into the shrimp outlet section S. When the eggs hatch the shrimp swim through passageway O under partition 14 into the lighter shrimp sections S.

When shrimp are needed, they can be drawn off with brine through outlet pipe 17 when the cork 18 is removed. A jelley glass 19 or other container with a filter cloth 20 placed over the mouth is used to catch the discharge from pipe 15 and strain the shrimp out of the brine. The brine in the container is then poured back into the brine inlet section B of the tray. The partition 13 prevents the brine poured in from flowing along bottom 11 into the egg hatching section E where it might wash debris such as unhatched spoiled eggs accumulated on the bottom in the egg hatching section E into the shrimp outlet section S. The flow of brine in the egg section E above the bottom will tend to move any hatched shrimp in the egg section toward the shrimp outlet section.

No more eggs should be placed in the egg hatching section E each day than are required to produce the daily requirement of shrimp, and this amount of eggs should be added each day, the eggs taking about 24 hours to hatch. The brine should be changed after three to five days.

If it is desired to aerate the eggs to encourage hatching, the partition 14 may be lowered to bottom while the egg hatching section E is aerated. This keeps eggs and egg shells out of the shrimp outlet section S. When the shrimp have hatched partition 14 can be raised to its normal position to let the shrimp swim into the shrimp outlet section.

While a preferred embodiment of the invention has been shown and described, many modifications thereof can be made by one skilled in the art without departing from the spirit of the invention and it is desired to cover by Letters Patent all forms of the invention falling within the scope of the following claims.

I claim:

1. A device for hatching brine shrimp comprising a liquid receptacle having a flat bottom and substantially vertical side walls, a partition dividing off a portion of said receptacle forming a shrimp outlet section, a passageway between said shrimp outlet section and the rest of said receptacle below the upper level of said partition, an outlet from said shrimp outlet section above the level of said bottom and below the upper level of said partition, and means to control the flow through said outlet, said shrimp outlet section being at least in part transparent to admit light thereto to attract the hatched shrimp thereto, the remainder of said receptacle being opaque whereby the hatched shrimp are attracted therefrom to the said lighted outlet section.

2. A device for hatching brine shrimp comprising a liquid receptacle having a flat bottom and substantially vertical side walls, a first partition dividing off a portion of said receptacle forming a brine inlet section, said first partition extending from the bottom of the receptacle to a level below the top of the side walls of the receptacle, a second partition dividing off another portion of said receptacle at a side thereof opposite said brine inlet section forming a shrimp outlet section, an egg hatching section formed in the portion of said receptacle between said two partitions, said second partition being spaced from the bottom of the receptacle to form a passage thereunder and extending above the upper edge of the first partition, an outlet in said shrimp outlet section disposed at a level above the bottom of the receptacle and below the top of said second partition, and means to close and open said outlet as desired, said admit light to said shrimp outlet section whereby shrimp shrimp outlet section being at least partly transparent to hatched in said egg hatching section are attracted thereto.

3. The combination of claim 2 in which the egg hatching and brine inlet sections are opaque whereby shrimp are attracted therefrom to said lighted outlet section.

4. A device for hatching brine shrimp comprising a flat liquid receptacle having a flat bottom and an open top, a first partition dividing off a portion of the interior of said receptacle for liquid flow thereover and forming a brine inlet section, a second partition disposed oppositely of said first partition dividing off a portion of the interior of said receptacle for liquid flow therebelow and forming a shrimp outlet section, an outlet from said shrimp outlet section spaced above said bottom, said shrimp outlet section being at least partly transparent to admit light thereto, said receptacle interior between said two partitions forming an egg hatching section, said receptacle being opaque at said brine inlet and egg hatching sections, whereby eggs charged to said egg hatching section are hatched therein in brine quiescently admitted thereto over said first partition from said brine inlet section and shrimp hatched in said egg hatching section are attracted by said light to said shrimp outlet section and discharged through said outlet.

5. A device for hatching brine shrimp comprising a liquid receptacle of flat form having an open top, a first partition having a flow passage thereover dividing off a terminal portion of said receptacle to form a brine inlet section, a second partition having an adjustable flow passage thereunder dividing off another terminal portion of said receptacle to form a shrimp outlet section, the remainder of said receptacle not divided off by one of said partitions forming an egg hatching section, a flow-controlled outlet from said shrimp outlet section intermediate its height, means for admitting light to said shrimp outlet section whereby hatched shrimp are attracted thereto through said flow passage under said second partition, and means for excluding light from said brine inlet and egg hatching sections whereby shrimp are attracted therefrom to said lighted shrimp outlet section.

References Cited in the file of this patent

UNITED STATES PATENTS

| 160,002 | Bond | Feb. 23, 1875 |
| 590,397 | Hornbeck | Sept. 21, 1897 |

FOREIGN PATENTS

| 59,987 | Austria | July 10, 1913 |